US009744726B2

(12) United States Patent
Levine et al.

(10) Patent No.: US 9,744,726 B2
(45) Date of Patent: Aug. 29, 2017

(54) 3D PRINT MANUFACTURING OF PACKAGES WITH PERSONALIZED LABELING TECHNOLOGY

(71) Applicant: XEROX CORPORATION, Norwalk, CT (US)

(72) Inventors: Jonathan D. Levine, Rochester, NY (US); Donald M. Pangrazio, III, LeRoy, NY (US)

(73) Assignee: Xerox Corporation, Norwalk, CT (US)

( * ) Notice: Subject to any disclaimer, the term of this patent is extended or adjusted under 35 U.S.C. 154(b) by 818 days.

(21) Appl. No.: 14/088,619

(22) Filed: Nov. 25, 2013

(65) Prior Publication Data

US 2015/0145158 A1    May 28, 2015

(51) Int. Cl.
  *B29C 67/00*    (2017.01)
  *B33Y 50/00*    (2015.01)
  *B29L 31/00*    (2006.01)

(52) U.S. Cl.
  CPC ...... *B29C 67/0088* (2013.01); *B29C 67/0059* (2013.01); *B29C 67/0085* (2013.01); *B33Y 50/00* (2014.12); *B29K 2995/0021* (2013.01); *B29L 2031/712* (2013.01)

(58) Field of Classification Search
  CPC .................. B29C 67/0088; B29C 67/0059
  See application file for complete search history.

(56) References Cited

U.S. PATENT DOCUMENTS 5,406,770 A    4/1995  Fikacek
6,032,004 A    2/2000  Mirabella, Jr. et al.
6,349,526 B1   2/2002  Newman
6,932,751 B1   8/2005  Ward et al.
7,647,752 B2   1/2010  Magnell
(Continued)

FOREIGN PATENT DOCUMENTS

DE    102009015327    9/2010
EP    2 199 065       3/2012

OTHER PUBLICATIONS http://www.zcorp.com/en/Products/3D-Printers/spage.aspx, Nov. 5, 2013, pp. 1-2.

(Continued)

*Primary Examiner* — Christina Johnson
*Assistant Examiner* — Xue Liu
(74) *Attorney, Agent, or Firm* — Gibb & Riley, LLC

(57) ABSTRACT

Methods and devices use a three-dimensional scanner and a three-dimensional printing device operatively connected to a processor. The three-dimensional scanner automatically determines a size and shape of an item to be packaged and the processor automatically identifies information corresponding to the item to be packaged. The processor automatically controls the three-dimensional printing device to form a container that is customized to match the size and shape of the item to be packaged (using a continuous additive process of forming successive layers of material in different shapes). When forming the container, the processor also automatically controls the three-dimensional printing device to form a label as part of the container. The label includes color variations to visually convey the information identified by the processor.

20 Claims, 6 Drawing Sheets

(56) References Cited

U.S. PATENT DOCUMENTS

| | | |
|---|---|---|
| 7,788,883 B2 | 9/2010 | Buckley et al. |
| 7,833,001 B2 | 11/2010 | Silverbrook |
| 8,142,860 B2 | 3/2012 | Vanmaele et al. |
| 8,170,706 B2 | 5/2012 | Gombert et al. |
| 2002/0079601 A1* | 6/2002 | Russell .................. B29C 41/12 264/40.1 |
| 2006/0155561 A1 | 7/2006 | Harper |
| 2007/0112460 A1 | 5/2007 | Kiselik |

OTHER PUBLICATIONS http://mashable.com/2013/03/28/3d-printing-explained/, Mar. 28, 2013. pp. 1-8.
http://www.economist.com/news/science-and-technology/21576378-tomorrows-batteries-will-be-squeezed-out-nozzles-toothpaste-total?fsrc=scn/tw/te/pe/totalextrusionzone, Printing BatteriesTotal Extrusion Zone, Apr. 20, 2013. pp. 1-2.

\* cited by examiner

3D PRINT MANUFACTURING OF PACKAGES WITH PERSONALIZED LABELING TECHNOLOGY

BACKGROUND

Systems and methods herein generally relate to container labeling and 3D printers.

Packaging is a growth area in printing, and some approaches involve printing labels. In particular, the packaging can be used as the medium on which the labels are printed. This has traditionally required running everything from cardboard to cellophane (instead of paper) through a printer, which requires complex modifications to machines originally designed to only print on thin paper.

Conventional three-dimensional (3D) printing is characterized as "additive" manufacturing, which means that a solid, three-dimensional object is constructed by adding material in layers. This is in contrast to "subtractive" manufacturing, through which an object is constructed by cutting (or "machining") raw material into a desired shape. 3D printer processes vary, but the material is usually sprayed, squeezed or otherwise transferred from the printer onto a platform.

The first stage of 3D printing is laying out an object's design with software, such as computer-aided design (CAD) or animation modeling software. Such software allows one to create a virtual blueprint of the object one wants to print. The software then automatically divides the designed object into digital cross-sections, which the printer builds layer by layer. The cross-sections essentially act as guides for the printer, so that the object is the exact size and shape designed.

After the finished design file is sent to the 3D printer, one chooses a specific material. Different print heads can add different materials to the object being created (e.g. rubber, plastics, paper, polyurethane-like materials, metals, and more). Then, the 3D printer makes passes (much like an inkjet printer) over the platform, depositing layer on top of layer of material to create the finished product. The average 3D-printed layer in common applications is approximately 100 microns (or micrometers) which is equivalent to 0.1 millimeters. Some printers can even deposit layers as thin as 5 microns.

SUMMARY

Systems and methods herein provide an element of the computer-aided design (CAD) program that allows the user to describe both the container/package (and its structure) and the label (or labels) as part of the same specification. This specification is then sent to the 3D print device or processor that controls the 3D print devices.

A processor automatically controls a three-dimensional printing device to form a container that is customized to match the size and shape of the item to be packaged (using a continuous additive process of forming successive layers of material in different shapes). When forming the container, the processor also automatically controls the three-dimensional printing device to form a label as part of the container.

The label corresponds to the item to be packaged and is formed using different colors during the continuous additive process of forming successive layers. The label can be a computer-readable label and/or a human-readable label. Further, the processor can automatically identify information corresponding to the item to be packaged. Thus, the label includes color variations to visually convey the information identified by the processor. Also, different labels can be formed for each different container created. Exemplary devices herein can additionally include a three-dimensional scanner operatively connected to a processor. The three-dimensional scanner automatically determines the size and shape of an item to be packaged.

Also, when forming the container, the processor can automatically control the three-dimensional printing device to form cushioning features within and as part of the container. Such cushioning features are formed to correspond to the size and shape of the item to be packaged within the container (during the continuous additive process of forming successive layers). Further, the processor can control the three-dimensional printing device to form closure flaps as part of the container during the continuous additive process of forming successive layers. In other devices herein, the processor can control the three-dimensional printing device to form the container to include a wireless device (e.g., RFID device) slot as part of the container during the continuous additive process of forming successive layers.

Various methods herein can determine the size and shape of an item to be packaged using an input design or optional three-dimensional scanner, and can identify information corresponding to the item to be packaged using a processor operatively connected to the three-dimensional scanner. These methods control the three-dimensional printing device (using the processor that is operatively connected to the three-dimensional printing device) to form a container customized to match the size and shape of the item to be packaged in a continuous additive process of forming successive layers of material in different shapes.

More specifically, the process of controlling the three-dimensional printing device to form the container comprises forming a label as part of the container. The label corresponds to the item to be packaged. The label is formed using different colors during the continuous additive process of forming successive layers. Thus, the label includes color variations to provide the information. Also, such methods can form cushioning features (corresponding to the size and shape of the item to be packaged) within and as part of the container during the continuous additive process of forming successive layers.

Additionally, the three-dimensional printing device can be controlled to form closure flaps as part of the container during the continuous additive process of forming successive layers. The three-dimensional printing device can be controlled to form the container to include a wireless device slot as part of the container during the continuous additive process of forming successive layers.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
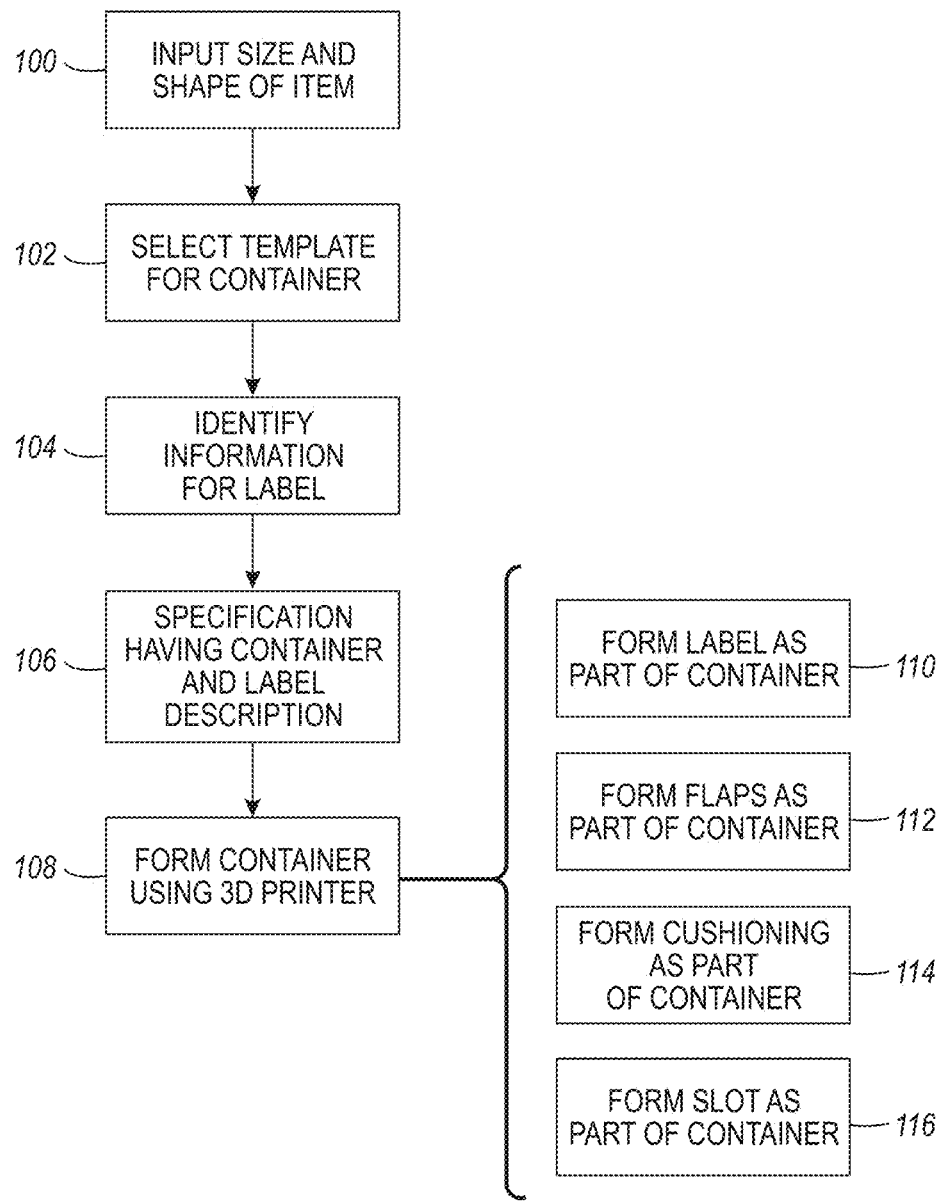
FIG. 1 is a flow diagram of various methods herein.

As mentioned above, printing labels directly on items can require everything from cardboard to cellophane (instead of paper) to be run through a printer, which requires modifications to printing machines originally designed to only print on thin paper. Therefore, the systems and methods herein create a label integral with a container using a 3D printer to personal specifications. The personalized specifications are produced by functionality in a CAD program that allows the specification of both a package and its label or labels. Thus, systems and methods herein provide an element of the computer-aided design (CAD) program that allows the user to describe both the container/package (and its structure) and the label (or labels) as part of the same specification. This specification is then sent to the 3D print device or processor that controls the 3D print devices.

The output of this local manufacturing process includes a package that may be (for example) a cardboard box, or an envelope of a specified size and shape that includes a label as part of its surface (as opposed to a label printed on the surface of a package). For boxes, fold lines are included or, optionally, the box can be manufactured to its desired shape.

Thus, with methods and devices herein, any label information (e.g., addresses, bar codes, QR codes) is manufactured onto the package in its correct location (as opposed to a label printed on the surface of a package). Postage can be included on the package as part of the manufacture process. Any tracking technologies (e.g., a GPS chip, an RFID sensor) can be built into the package during the manufacturing process.

Thus, printing the appropriate (personalized) package uses two main stages: scan or design, and print. To simplify package specifications, the methods and devices herein can use templates, for example, templates for boxes and envelopes. Those ordinarily skilled in the art would understand that additional templates are possible and that these templates are used as simple examples. In some cases these templates are more specific versions of a generic "box" or "envelope" templates. In particular, after specifying a particular box or envelope with its labels, the user can save that specification to reuse later or as a template.

Thus, the methods and devices herein provide many ways to "personalize" the container and/or label. For example, the methods and devices can personalize the container and/or label using a variable data application, where every container and address is unique. Further, the methods and devices can personalize the container and/or label using a mail-merge type operation where an address list is merged with a form for a container. In another example, the methods and devices herein can have multiple personalization operations, one on the container, and one on the label. For example, when personalizing the container for a first person or putting a serial number on it, the methods and devices retrieve data from a different database than that used for personalizing the shipping address on the container.

Further, the methods and devices herein can scan the item to be packaged to determine its size and general shape, automatically select a container template matching the general shape, and scale the matching template to the size of the item to be placed in the container. This creates a custom container (having an integral, unique label that is part of the material surface) that is sized and shaped differently for each different item that is to be packaged. Some more specific examples follow.

In one example, when selecting a box template, the user can specify a rectangular solid shape for the package. The user can select (through a graphical user interface) the parameters for the box including: dimensions (length, width, height); container material (cardboard, plastic, metal); container material thickness (with constraints); opening type and location (top flap, side flap, end flap, top seal, side seal, end seal); box completeness (foldable (i.e., a flat sheet that the user can fold); complete; etc.); voids (the optional location of holes in the box, for example, for use as a hand grip; a hanger for displaying the box on a store rack; etc.); transparencies (the optional location of areas on the surface of the box that are transparent, for example, that a person can use to see into the box); cushioning (the optional location on internal areas of the box for material that will prevent damage to the contents of the box; in one embodiment, the user can choose between bubble wrap and styrofoam; and other options are available).

In another example, when selecting an envelope template, the user specifies an essentially-flat (two-dimensional) pouch that can be sealed. The user can select (through a graphical user interface) the following parameters for the envelope: dimensions (length, width); container material type (paper, plastic); container material thickness (with constraints); opening location (top flap, side flap); type of seal for the flap (metal clasp, adhesive, metal clasp and adhesive, none); voids (the optional location of holes in the envelope, e.g. a place where the address, located on the content inside the envelope, shows through); transparencies (the optional location of areas on the surface of the envelope that are transparent, for example, that a person can use to see into the envelope); cushioning (the optional location on internal areas of the envelope for material that will prevent damage to the contents of the envelope; in one embodiment, the user can select small-cell bubble wrap; in other embodiments, other options may be available).

After the user specifies the box or envelope details (or such is automatically determined after scanning the item to be packaged) the user can specify the location and content of label information, and labels can be saved for subsequent reuse. In some examples, a label can contain: one or more sets of user-specified textual information in an arbitrary (user-selected) font, font color, and font size, with each set being positioned independently; the user can optionally select a Braille font; one or more barcodes or glyphs, positioned independently; one or more quick-reference (QR) codes positioned independently; the user can position each label item on any location on the box or envelope; etc. After the user specifies the box or envelope, the user can, if necessary, specify the location and content of one or more RFID tags.

After the user specifies the package details and its various labels (if any), the user sends the job to the 3D printer, which is capable of manufacturing the container specified. To speed the process, the CAD application can be connected to multiple printers, each set up to produce packages of different materials. The 3D printer creates the package according to the CAD specifications using normal 3D printing methods, where layers of the packaging material are built up by the print head. At the appropriate time, other print heads may come into play, building a clip or an adhesive layer, and/or an RFID tag if specified.

Therefore, instead of printing labels, RFID tags, and postage and applying them to pre-existing packages, the labels, RFID tags, and postage are manufactured as part of the exterior of the package. In addition, a package can be constructed to custom fit its intended contents, thereby reducing shipping damage, postage, material, and delivery costs.

FIG. 1 is flowchart illustrating exemplary methods herein. In item 100, the user inputs the size and shape of the item to be placed in the container. For example, such information can be input to a CAD program that utilizes the features of the methods and systems herein.

In item 102, the template for the container is selected. Again, this can be done by the user manually, or can be done automatically by a processor matching the shape of the scanned item to the shape of an existing template, and scaling the template to the item's size.

In item 104, these methods can identify information corresponding to the item to be packaged that can be used on a label that will be formed on the outside of the container. This process can also be done manually by the user, or automatically by the processor. For example, in item 104, if many different items are being shipped to different customers, such items can be delivered in a specific order corresponding to the order of different shipping addresses within a file supplied to the processor. Such data can include the information for the label or can contain information describing the name and location of a file containing the information for the label. Such information for the label can include addresses, warehouse locations, item descriptions, item weights, and item sizes, decorative signs and markings etc.

Thus, in items 100-104, the user specifies the size, shape, and characteristics of the container and its labels, using a CAD program that utilizes the features of the methods and systems herein. This produces a specification having both the container and label descriptions, as shown in item 106.

More specifically, in item 106 personalized specifications are produced by the CAD program, and this specification includes both a package description and label description. Thus, systems and methods herein provide an element to the computer-aided design (CAD) program that allows the user to describe both the container/package (and its structure) in item 100 and the label (or labels) in item 104 as part of the same specification in item 106. This specification is then sent to the 3D print device or processor that controls the 3D print devices in item 108.

More specifically in item 108, these methods control the three-dimensional printing device (using the processor that is operatively connected to the three-dimensional printing device) to form a container (e.g., an envelope, a box, a case, etc.) customized to match the size and shape of the item to be packaged in (e.g., placed in, contained within) the container. More specifically, the process of controlling the three-dimensional printing device to form the container forms the label as part of the container (as shown by item 110). The label can be a computer-readable label and/or a human-readable label. In item 110, the label that is formed as part of the container corresponds to the item to be packaged within the container.

As is understood by those ordinarily skilled in the art, three-dimensional printers form three-dimensional items by applying (and sometimes curing) multiple different shaped or patterned layers of the same or different materials in a continuous additive process that forms successive layers of such materials (one layer upon the next layer) into different three-dimensional shaped items. Forming exterior surface areas of the container to have different colors form the label as part of the container. The label includes such color variations to provide the label information. Differences in color can be achieved by using differently colored materials or the same material that is colored differently when forming different areas of a layer and/or forming different layers in the additive manufacturing 3D printing process. Such color variations on the exterior surface of the container visually convey the information identified by the processor to users or machine readers. Alternative, raised features can be formed as part of (or the entire) label to permit Braille printing, or to provide other label features. Different labels can be potentially formed for each different container created.

Further, the use of different materials to make up distinguishing portions of the label allows the label to be read by many types of machine readers. For example, some of the materials used to form the label part of the container can have patterned magnetic characteristics that can be detected by magnetic readers. Other materials used to form the label part of the container can have different densities, different textures, different raised features, different coefficients of reflection, etc., that allow different readers (human and machine) to recognize the information contained in the label.

Additionally, in item 112 the three-dimensional printing device can be controlled to form closure flaps as part of the container during the continuous additive process of forming successive layers. These flaps can also be formed to include areas that are relatively thinner than other areas, thereby forming fold lines around which the flaps are to be folded.

In item 114, such methods can form cushioning features (corresponding to the size and shape of the item to be packaged) within and as part of the container during the continuous additive process of forming successive layers (as shown by item 108). For example, such cushioning features can be formed simultaneously with the remainder of the container, but using a different material from that used for the remainder of the container.

Thus, while the other parts of the container can be formed of a relatively harder, stiffer, and more durable material, the cushioning features can be formed of a different material specifically designed to have cushioning characteristics (relatively higher flexibility, relatively lower density, relatively higher coefficient of friction, etc. when compared to the remainder of the container). Alternatively, the cushioning features can be formed by forming voids or air pockets in the same material used for the other portions of the container, etc. Further, these cushioning elements of the container can be formed within each layer as the additive process of forming the container progresses, or they can be formed in a separate process after the remainder of the container has been completely formed.

As shown in item 116, the three-dimensional printing device can be controlled to form the container to include a wireless device slot as part of the container during the continuous additive process of forming successive layers. For example, the wireless device slot can be sized to accommodate a magnetic device or radio frequency transponder to accommodate radio frequency identification (RFID), etc.

Figure 2:
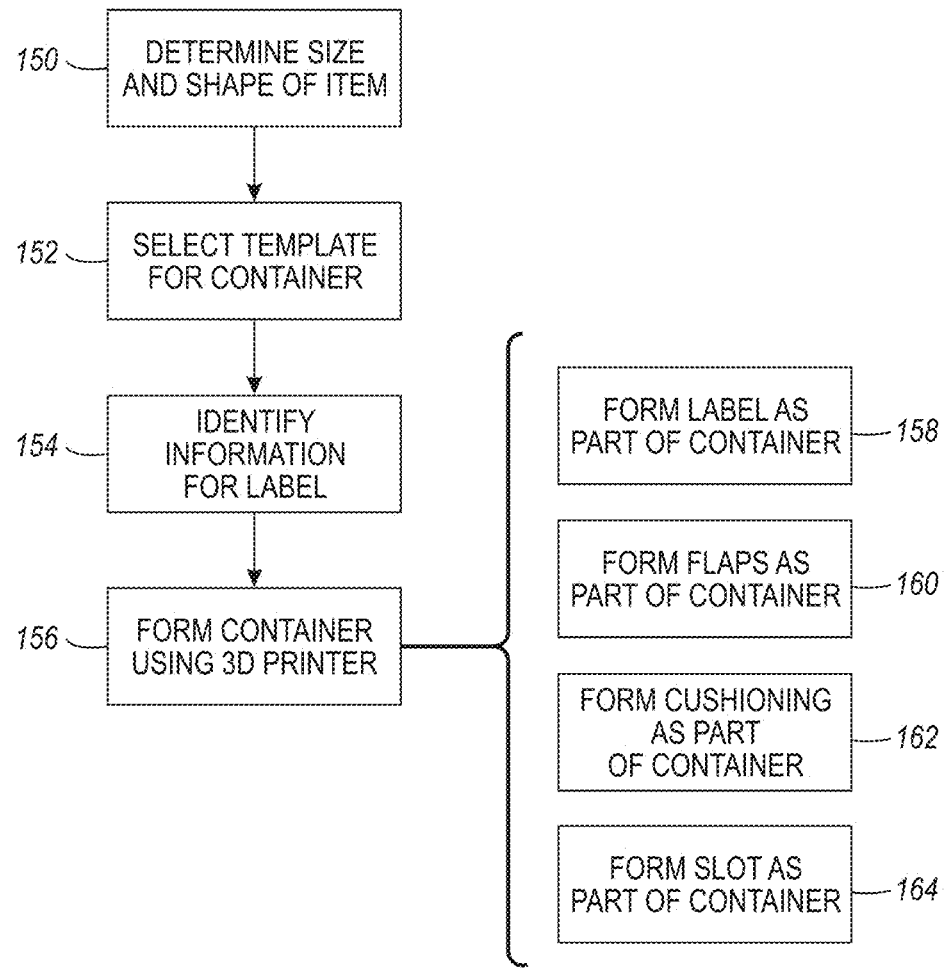
FIG. 2 is a flow diagram of various methods herein.

FIG. 2 is flowchart illustrating exemplary methods herein. In item 150, these methods can determine the size and shape of an item to be packaged. As mentioned above, this can be done by the user manually through a CAD or other similar program, or can be done automatically using, for example, a three-dimensional scanner. Such a three-dimensional scanner can comprise a light or sound based device that determines the shape, size, contours, etc., of any item to be packaged and/or shipped. Not every item needs to be scanned, because once an item is scanned the details of its shape and size can be recorded and used for all subsequent identical items.

In item 152, the template for the container is selected. Again, this can be done by the user manually, or can be done automatically by a processor matching the shape of the scanned item to the shape of an existing template, and scaling the template to the item's size.

In item 154, these methods can identify information corresponding to the item to be packaged that can be used on a label that will be formed on the outside of the container. This process can also be done manually by the user, or automatically by the processor. For example, the processor can be operatively connected to the three-dimensional scanner and can automatically identify label information based on the scan in item 154.

For example, if many different items are being shipped to different customers, such items can be delivered in a specific order corresponding to the order of different shipping addresses within a file supplied to the processor. Alternatively, in item 154, items delivered to the scanner can maintain computer-readable markings (barcodes, glyphs, etc.) and the scanner can read such computer-readable markings and supply the data contained in such computer-readable markings to the processor. Such data contained in such computer-readable markings can include the information for the label or can contain information describing the name and location of a file containing the information for the label. Such information for the label can include addresses, warehouse locations, item descriptions, item weights, and item sizes, decorative signs and markings etc.

In item 156, these methods control the three-dimensional printing device (using the processor that is operatively connected to the three-dimensional printing device) to form a container (e.g., an envelope, a box, a case, etc.) customized to match the size and shape of the item to be packaged in (e.g., placed in, contained within) the container. More specifically, the process of controlling the three-dimensional printing device to form the container forms the label as part of the container (as shown by item 158). The label can be a computer-readable label and/or a human-readable label. In item 158, the label that is formed as part of the container corresponds to the item to be packaged within the container.

Additionally, in item 160 the three-dimensional printing device can be controlled to form closure flaps as part of the container during the continuous additive process of forming successive layers. These flaps can also be formed to include areas that are relatively thinner than other areas, thereby forming fold lines around which the flaps are to be folded.

In item 162, such methods can form cushioning features (corresponding to the size and shape of the item to be packaged) within and as part of the container during the continuous additive process of forming successive layers. For example, such cushioning features can be formed simultaneously with the remainder of the container, but using a different material from that used for the remainder of the container.

As shown in item 164, the three-dimensional printing device can be controlled to form the container to include a wireless device slot as part of the container during the continuous additive process of forming successive layers. For example, the wireless device slot can be sized to accommodate a magnetic device or radio frequency transponder to accommodate radio frequency identification (RFID), etc.

Figure 3:
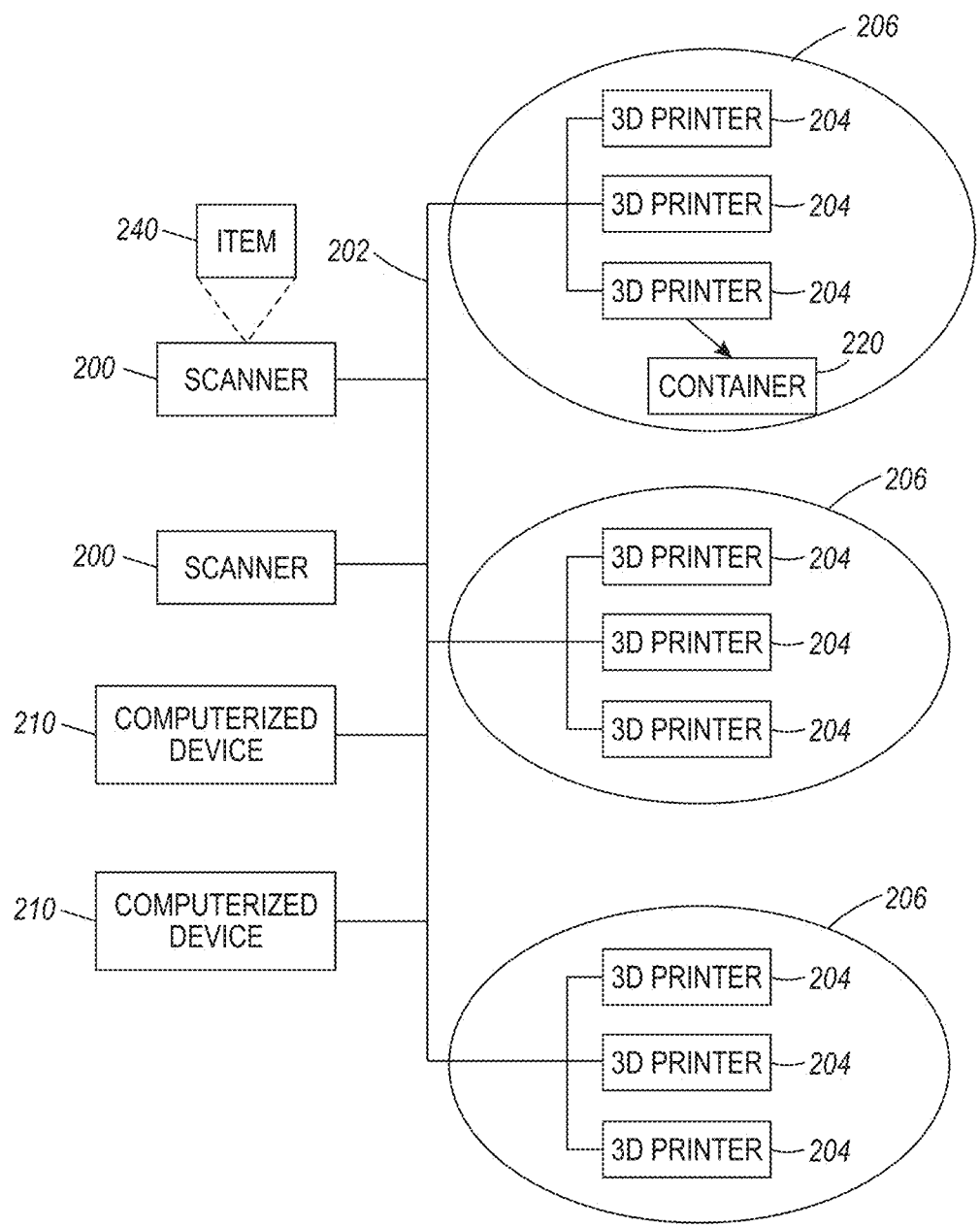
FIG. 3 is a schematic diagram illustrating systems herein.

As shown in FIG. 3, exemplary system systems and methods herein include various computerized devices 208, which can be located at the same location or various different physical stations or locations 206. The computerized devices 208 can include print servers, personal computers, etc., that are in communication (operatively connected to one another) by way of a local or wide area (wired or wireless) network 202. The "processor" that performs the various processes herein can be included in any of the devices illustrated in FIG. 3, including the scanners 200, the computerized devices 208, the 3D printers 204, or elsewhere in the network 202.

As noted above, the three-dimensional scanners 200 can automatically determine the size and shape of an item to be packaged. In FIG. 3, one or more processors in at least one computerized device 210 (which can be integral with any of the scanners 200, computerized devices 210, 3D printers 204, etc.) automatically control one of the three-dimensional printing devices 204 to form a container 220 that is customized to match the size and shape of the item to be packaged (using a continuous additive process of forming successive layers of material in different shapes).

Figure 4:
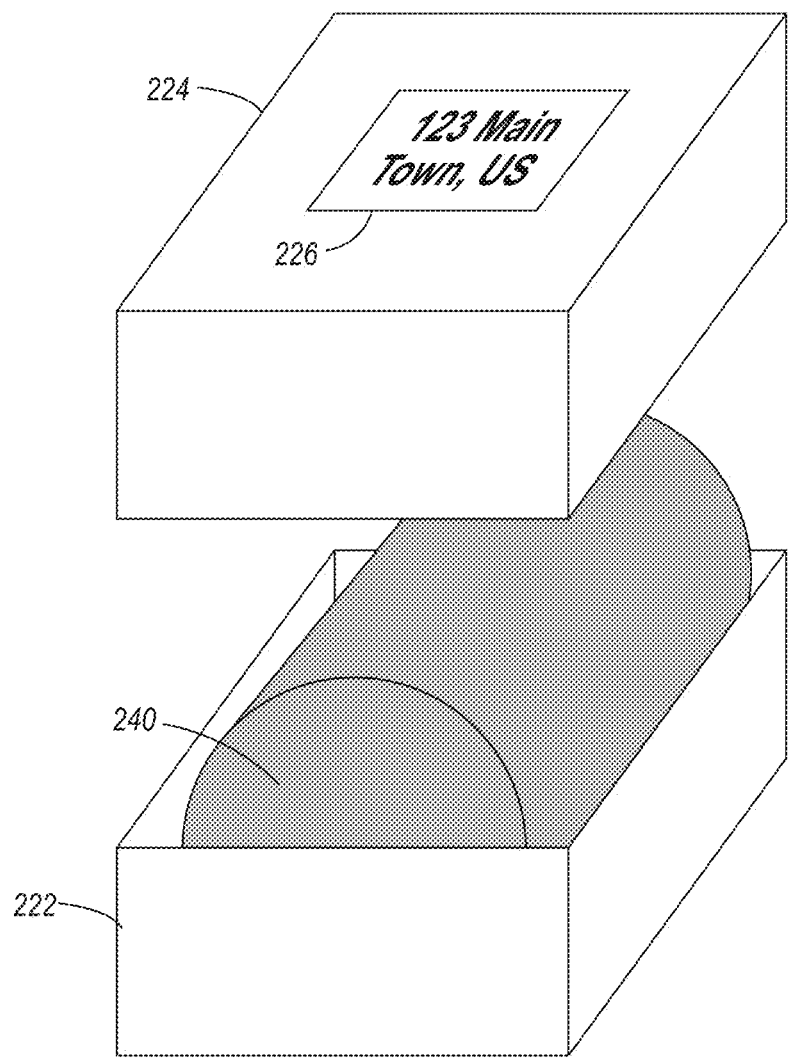
FIG. 4 is a schematic diagram illustrating labeled containers produced by systems and methods herein.
Figure 5:
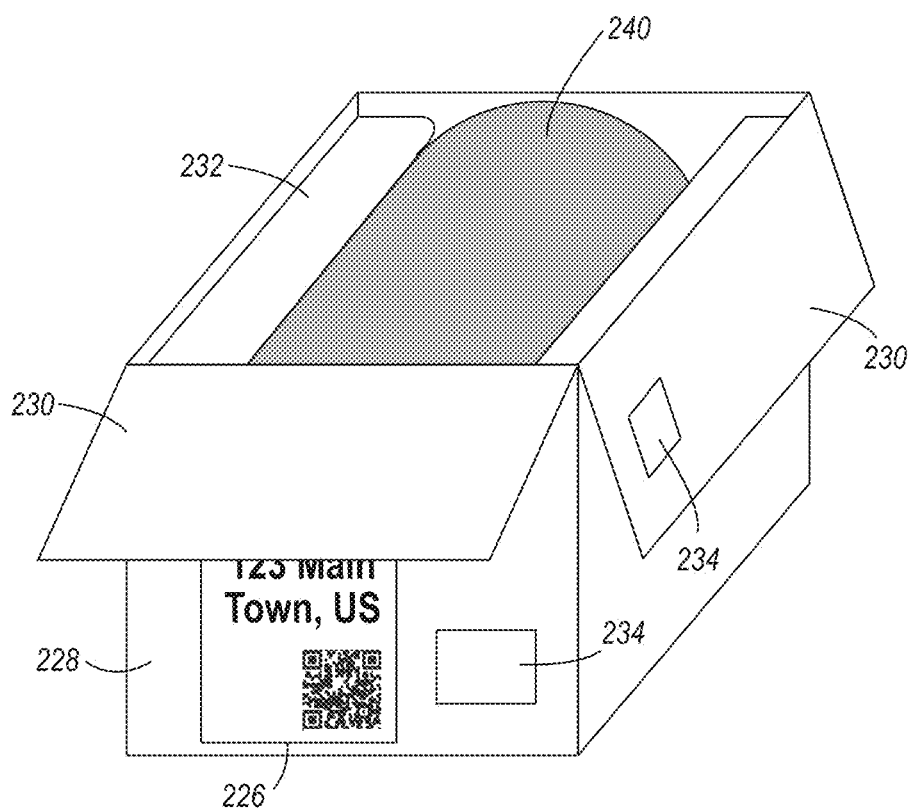
FIG. 5 is a schematic diagram illustrating labeled containers produced by systems and methods herein.

For example, FIGS. 4 and 5 illustrate some box containers 222 and 228. While FIGS. 4 and 5 only illustrate two containers, those ordinarily skilled in the art would understand than an unlimited number of different shapes could be formed (including, but not limited to envelopes, rounded shapes, rectangular shapes, multi-sided shapes, etc.). FIG. 4 illustrates a two-part container having a base 222 and a top 224, with the label 226 formed as part of the surface of the top 224. FIG. 5 illustrates a single-part container 228 having flaps 230 and a label 226 formed as part of the container surface. FIG. 5 also illustrates the cushioning features 232 and the slot 234 for the wireless devices.

The label 226 corresponds to the item 240 to be packaged and is formed using different colors during the continuous additive process of forming successive layers. The label 226 can be a computer-readable label 226 and/or a human-readable label 226. Further, the computerized device 210 can automatically identify information corresponding to the item 240 to be packaged. Thus, the label 226 includes color variations (which includes black, white, grayscale variations, as well as all other colors) to visually convey the information identified by the computerized device 210. Also, different labels 226 can be formed for each different container 220 created.

When forming the container 220, the computerized device 208 can automatically control the three-dimensional printing device 204 to form cushioning features 232 within and as part of the container 220. Such cushioning features 232 are formed to correspond to the size and shape of the item 240 to be packaged within the container 220 (during the continuous additive process of forming successive layers). Further, the computerized device 208 can control the three-dimensional printing device 204 to form closure flaps 230 as part of the container 220 during the continuous additive process of forming successive layers. In other devices herein, the computerized device 208 can control the three-dimensional printing device 204 to form the container 220 to include a wireless device (e.g., RFID device) slot 234 as part of the container 220 during the continuous additive process of forming successive layers.

Thus, the methods, systems, and devices herein create packages using a 3D printer to personal specifications. The output of this manufacturing process includes a package that may be (for example) a cardboard box, or an envelope of a specified size and shape. For boxes, fold lines are included or, optionally, the box can be manufactured to its desired shape. In addition, if any label information (e.g., addresses, bar codes, QR codes) is manufactured onto the package in its correct location, postage can be included on the package as part of the manufacture process. Any tracking technologies (e.g., a GPS chip; an RFID sensor) can be built into the package during the manufacturing process. Clips can also be included on the package during the manufacturing process.

Thus, instead of having to add labels or marks to an existing material, the container material and label marks are manufactured together.

Figure 6:
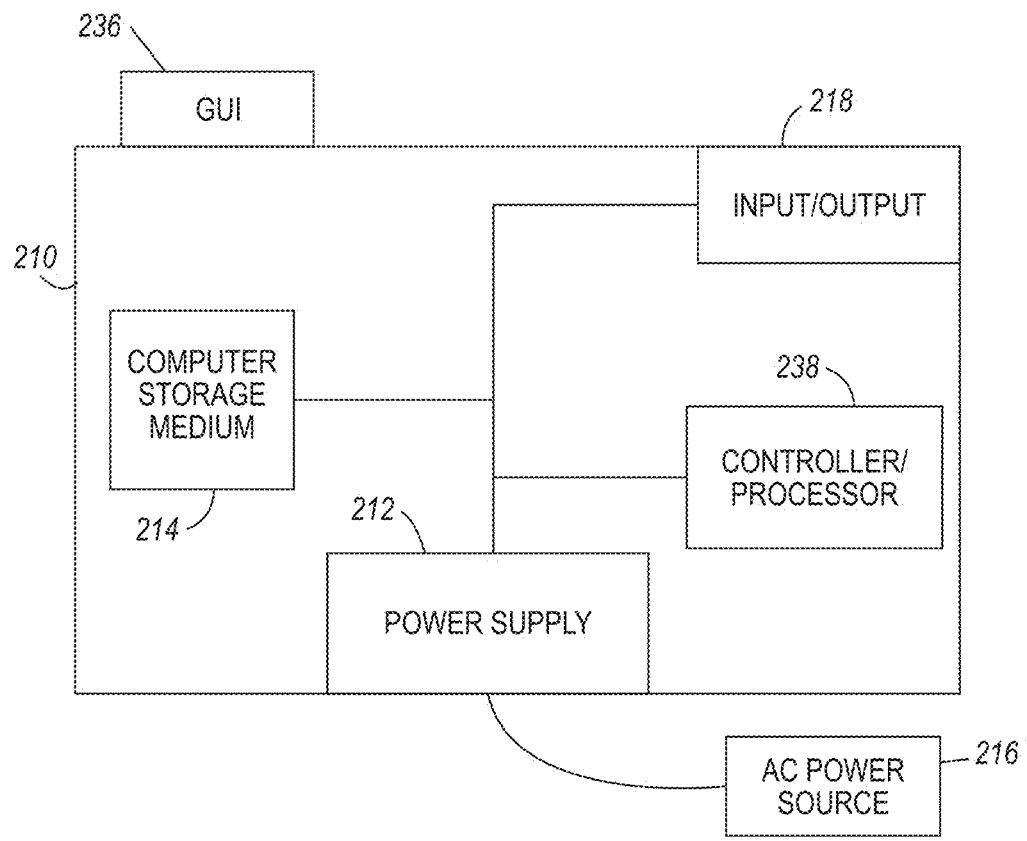
FIG. 6 is a schematic diagram illustrating devices herein.

FIG. 6 illustrates a computerized device 210, which can be used with systems and methods herein and can comprise, for example, any of the devices mentioned above, etc. The computerized device 210 includes a controller/processor 238 and a communications port (input/output) 218 operatively connected to the processor 238. Also, the computerized device 210 can include at least one accessory functional component, such as a graphic user interface assembly 236 that also operates on the power supplied from the external power source 216 (through the power supply 212).

The input/output device 218 is used for communications to and from the computerized device 210. The processor 238 controls the various actions of the computerized device. A non-transitory computer storage medium device 214 (which can be optical, magnetic, capacitor based, etc.) is readable by the processor 238 and stores instructions that the processor 238 executes to allow the computerized device to perform its various functions, such as those described herein. Thus, as shown in FIG. 6, a body housing has one or more functional components that operate on power supplied from an alternating current (AC) source 216 by the power supply 212. The power supply 212 can comprise a power storage element (e.g., a battery, etc.).

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. An apparatus comprising:
   a processor;
   a three-dimensional scanner operatively connected to said processor, said three-dimensional scanner automatically determining a size and shape of an item to be packaged; and
   a three-dimensional printing device operatively connected to said processor,
   said processor receiving a label description for said item to be packaged,
   said processor automatically controlling said three-dimensional printing device to:
     form a container customized to match said size and shape of said item to be packaged using a continuous additive process of forming successive layers of material in different shapes; and
     form a label based on said label description as part of said container using different colors during said continuous additive process of forming successive layers, said label including color variations to visually convey information, and
   said processor automatically controlling said three-dimensional printing device to form different labels for each different container, such that each different container and each different label are automatically customized for each different item to be packaged.

2. The apparatus according to claim 1, said processor controlling said three-dimensional printing device to form closure flaps as part of said container during said continuous additive process of forming successive layers.

3. The apparatus according to claim 1, said processor controlling said three-dimensional printing device to form said container to include a wireless device slot as part of said container during said continuous additive process of forming successive layers.

4. The apparatus according to claim 1, said processor controlling said three-dimensional printing device to form a computer-readable label and a human-readable label as part of said container during said continuous additive process of forming successive layers.

5. An apparatus comprising:
   a processor;
   a three-dimensional printing device operatively connected to said processor; and
   a three-dimensional scanner operatively connected to said processor, said three-dimensional scanner automatically determining a size and shape of an item to be packaged,
   said processor automatically identifying information corresponding to said item to be packaged;
   said processor automatically controlling said three-dimensional printing device to:
     form a container customized to match said size and shape of said item to be packaged using a continuous additive process of forming successive layers of material in different shapes;

form a label as part of said container corresponding to said item to be packaged while forming said container using different colors during said continuous additive process of forming successive layers, said label including color variations to visually convey said information; and form cushioning features corresponding to said size and shape of said item to be packaged within said container during said continuous additive process of forming successive layers, and said processor automatically controlling said three-dimensional printing device to form different labels for each different container, such that each different container and each different label are automatically customized for each different item to be packaged.

6. The apparatus according to claim 5, said processor controlling said three-dimensional printing device to form closure flaps as part of said container during said continuous additive process of forming successive layers.

7. The apparatus according to claim 5, said processor controlling said three-dimensional printing device to form said container to include a wireless device slot as part of said container during said continuous additive process of forming successive layers.

8. The apparatus according to claim 5, said processor controlling said three-dimensional printing device to form a computer-readable label and a human-readable label as part of said container during said continuous additive process of forming successive layers.

9. The apparatus according to claim 1, said label comprising an integral label that is part of the material surface of the container.

10. The apparatus according to claim 5, said label comprising an integral label that is part of the material surface of the container.

11. An apparatus comprising:
a processor;
a three-dimensional printing device operatively connected to said processor; and
a three-dimensional scanner operatively connected to said processor, said three-dimensional scanner automatically determining a size and shape of an item to be packaged,
said processor receiving a label description for said item to be packaged,
said processor automatically controlling said three-dimensional printing device to:
  form a container customized to allow said item to be packaged to be placed in said container, based on said size and shape of said item to be packaged, using a continuous additive process of forming successive layers of material in different shapes;
  form a label as part of said container corresponding to said item to be packaged while forming said container using different colors during said continuous additive process of forming successive layers, said label including color variations to visually convey said label description; and
  form cushioning features corresponding to said size and shape of said item to be packaged within said container during said continuous additive process of forming successive layers, and
said processor automatically controlling said three-dimensional printing device to form different labels for each different container, such that each different container and each different label are automatically customized for each different item to be packaged.

12. The apparatus according to claim 11, said processor controlling said three-dimensional printing device to form closure flaps as part of said container during said continuous additive process of forming successive layers.

13. The apparatus according to claim 11, said processor controlling said three-dimensional printing device to form said container to include a wireless device slot as part of said container during said continuous additive process of forming successive layers.

14. The apparatus according to claim 11, said processor controlling said three-dimensional printing device to form a computer-readable label and a human-readable label as part of said container during said continuous additive process of forming successive layers.

15. The apparatus according to claim 11, said label comprising an integral label that is part of the material surface of the container.

16. An apparatus comprising:
a processor;
a three-dimensional printing device operatively connected to said processor; and
a three-dimensional scanner operatively connected to said processor, said three-dimensional scanner automatically determining a size and shape of an item to be packaged,
said processor receiving a shipping address for said item to be packaged,
said processor automatically controlling said three-dimensional printing device to:
  automatically select a container template matching said size and shape of said item to be packaged;
  automatically scale said container template to said size and shape of said item to be packaged to allow said item to be packaged to be placed in said container, to produce a scaled container template;
  form a container customized to match said scaled container template using a continuous additive process of forming successive layers of material in different shapes;
  form a label as part of said container corresponding to said item to be packaged while forming said container using different colors during said continuous additive process of forming successive layers, said label including color variations to visually convey said shipping address; and
  form cushioning features corresponding to said size and shape of said item to be packaged within said container during said continuous additive process of forming successive layers, and
said processor automatically controlling said three-dimensional printing device to form different labels for each different container, such that each different container and each different label are automatically customized for each different item to be packaged.

17. The apparatus according to claim 16, said processor controlling said three-dimensional printing device to form closure flaps as part of said container during said continuous additive process of forming successive layers.

18. The apparatus according to claim 16, said processor controlling said three-dimensional printing device to form said container to include a wireless device slot as part of said container during said continuous additive process of forming successive layers.

19. The apparatus according to claim 16, said processor controlling said three-dimensional printing device to form a computer-readable label and a human-readable label as part of said container during said continuous additive process of forming successive layers.

20. The apparatus according to claim 16, said label comprising an integral label that is part of the material surface of the container.

\* \* \* \* \*